(12) United States Patent
Lamberti (10) Patent No.: US 12,443,093 B2
(45) Date of Patent: Oct. 14, 2025

(54) APPARATUS FOR PROTECTING BODY WORN DEVICES

(71) Applicant: The Government of the United States of America, as represented by the Secretary of Homeland Security, Washington, DC (US)

(72) Inventor: Stephen G. Lamberti, Tucson, AZ (US)

(73) Assignee: The Government of the United States of America, as represented by the Secretary of Homeland Security, Washington, DC (US)

(*) Notice: Subject to any disclaimer, the term of this patent is extended or adjusted under 35 U.S.C. 154(b) by 0 days.

(21) Appl. No.: 18/884,460

(22) Filed: Sep. 13, 2024

(65) Prior Publication Data
US 2025/0164860 A1    May 22, 2025

Related U.S. Application Data

(60) Provisional application No. 63/599,878, filed on Nov. 16, 2023.

(51) Int. Cl.
*G03B 17/56* (2021.01)
(52) U.S. Cl.
CPC ................... *G03B 17/56* (2013.01)
(58) Field of Classification Search
None
See application file for complete search history.

(56) References Cited

U.S. PATENT DOCUMENTS

| 10,299,553 | B1* | 5/2019 | Hoover | H04B 1/3888 |
|---|---|---|---|---|
| 10,687,524 | B2* | 6/2020 | D'Acquisto | G03B 17/56 |
| 10,966,496 | B2* | 4/2021 | Richardson | H05K 5/0086 |
| 12,066,748 | B2* | 8/2024 | Crow | G03B 17/08 |
| 2007/0110416 | A1* | 5/2007 | Yamaguchi | G03B 17/08 |
| | | | | 396/27 |
| 2013/0229515 | A1* | 9/2013 | Barley | H04N 7/183 |
| | | | | 348/143 |
| 2017/0318218 | A1* | 11/2017 | Schelhasse | H04N 21/00 |
| 2020/0218136 | A1* | 7/2020 | Au | A45C 11/38 |

* cited by examiner

*Primary Examiner* — Clayton E. LaBalle
*Assistant Examiner* — Diana Hancock
(74) *Attorney, Agent, or Firm* — Kelly G. Hyndman; Robert W. Busby (57) ABSTRACT

In an example, a cover device is used for a target device having an activation button. The cover device has a body which comprises: a front member configured to cover the activation button at least partially; a first side member disposed on a first side of the front member; a second side member disposed on a second side of the front member; a first rear member connected to the first side member and extending partially toward the second side member; and a second rear member connected to the second side member and extending partially toward the first side member. The first rear member and the second rear member are spaced by a rear distance smaller than a distance between the first side member and the second side member.

22 Claims, 10 Drawing Sheets

APPARATUS FOR PROTECTING BODY WORN DEVICES

CROSS-REFERENCE TO RELATED APPLICATIONS

The application is a nonprovisional of and claims the benefit of priority from U.S. Provisional Patent Application No. 63/599,878 filed on Nov. 16, 2023, entitled APPARATUS FOR PROTECTING BODY WORN DEVICES, the entire disclosures of which are incorporated by reference.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to apparatuses and methods of protecting body worn devices which includes preventing inadvertent activation of a body-worn device such as a body camera or bodycam.

BACKGROUND

Body-worn video cameras are worn by law enforcement personnel to capture video of law enforcement encounters. Accidental or unnecessary activation of these devices can cause video to be recorded when there is no need to record. This can cause depletion of batteries and a waste of data space on external servers.

SUMMARY

Embodiments of the present invention are directed to apparatuses and methods for protecting the activation button of body worn camera to prevent accidental activation in a simple, reliable, and effective manner. In one embodiment, an inadvertent activation prevention device is a single-piece hard member that protects the activation button from being pressed without cause. Protecting this button prevents the wearer of the body worn camera from accidentally or inadvertently activating the body worn camera during routine law enforcement operations where recording is unwarranted and unnecessary. This cover device is configured to clip onto current issued body worn cameras and prevent the unintentional starting or stopping of recordings caused by pressing the center button or activation button. Due to the rugged environment and activities of Border Patrol Agents, for example, the main recording button can be mistakenly activated resulting in unwanted recordings. This device allows for full functionality while still preventing unintentional button activations.

An aspect is directed to a cover device for a target device having an activation button. The cover device has a body which comprises: a front member configured to cover the activation button at least partially; a first side member disposed on a first side of the front member; a second side member disposed on a second side of the front member; a first rear member connected to the first side member and extending partially toward the second side member; and a second rear member connected to the second side member and extending partially toward the first side member. The first rear member and the second rear member are spaced by a rear distance smaller than a distance between the first side member and the second side member.

Another aspect is directed to a cover device for a target device having an activation button. The cover device has a body which comprises: a front member configured to cover the activation button at least partially; a first side member disposed on a first side of the front member; a second side member disposed on a second side of the front member; a first rear member connected to the first side member and extending partially toward the second side member; and a second rear member connected to the second side member and extending partially toward the first side member. The first rear member forms a first J-shaped hook with the first side member, a first tip of the first J-shaped hook pointing toward an interior front surface of the front member. The second rear member forms a second J-shaped hook with the second side member, a second tip of the second J-shaped hook pointing toward the interior front surface of the front member.

Yet another aspect is directed to a cover device for a target device having an activation button. The cover device has a body which comprises: a front member configured to cover the activation button at least partially; a first side member disposed on a first side of the front member; and a second side member disposed on a second side of the front member. The front member includes a smallest thickness portion extending from a bottom of the body to a curved edge of a lower curved cut-out portion; an intermediate thickness portion having an upper annular shape around the curved edge; and a largest thickness portion forming an interior front projection disposed between the smallest thickness portion and the intermediate thickness portion.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Figure 1:
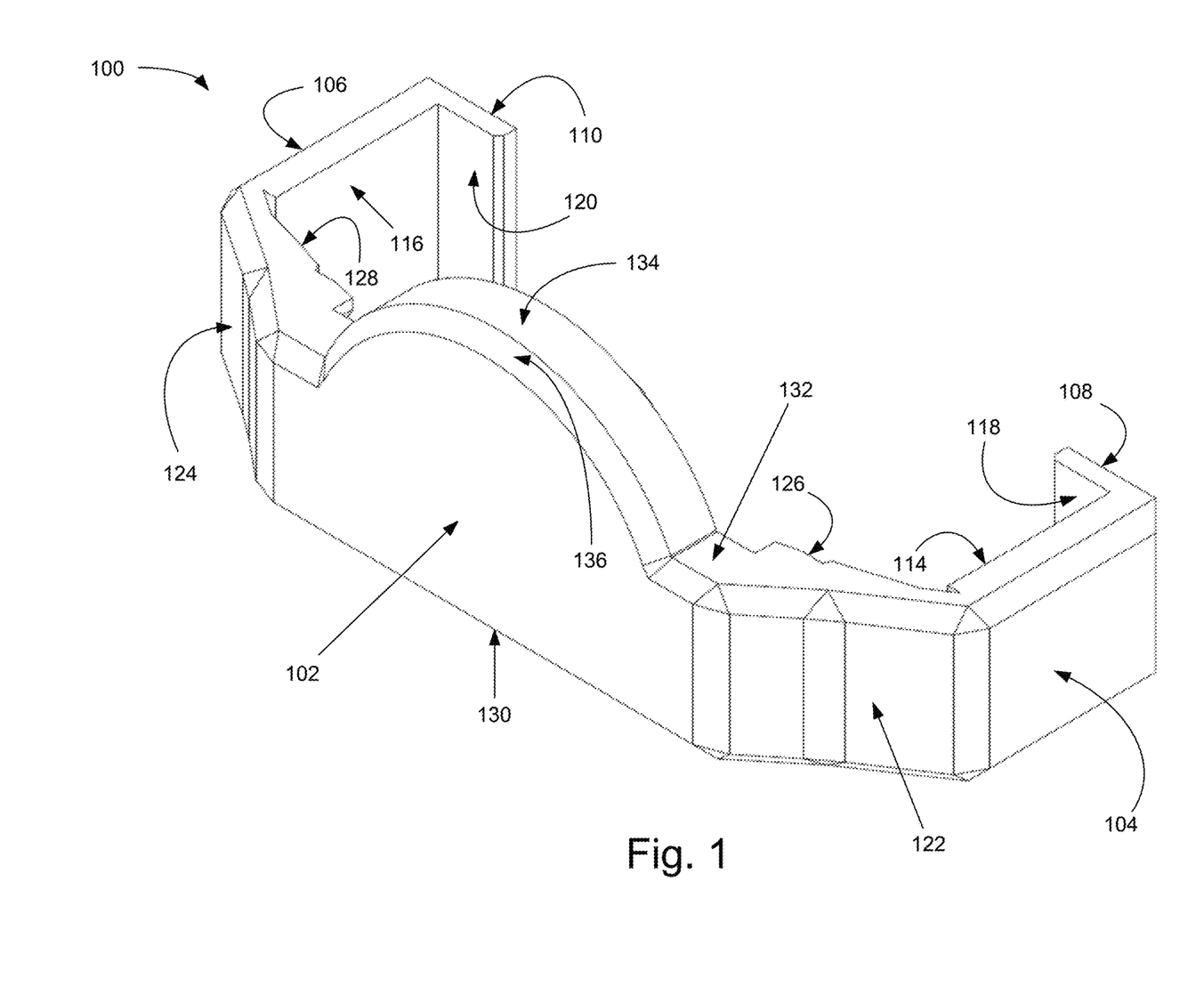
FIG. 1 is a front perspective view of a cover device according to an embodiment.
Figure 2:
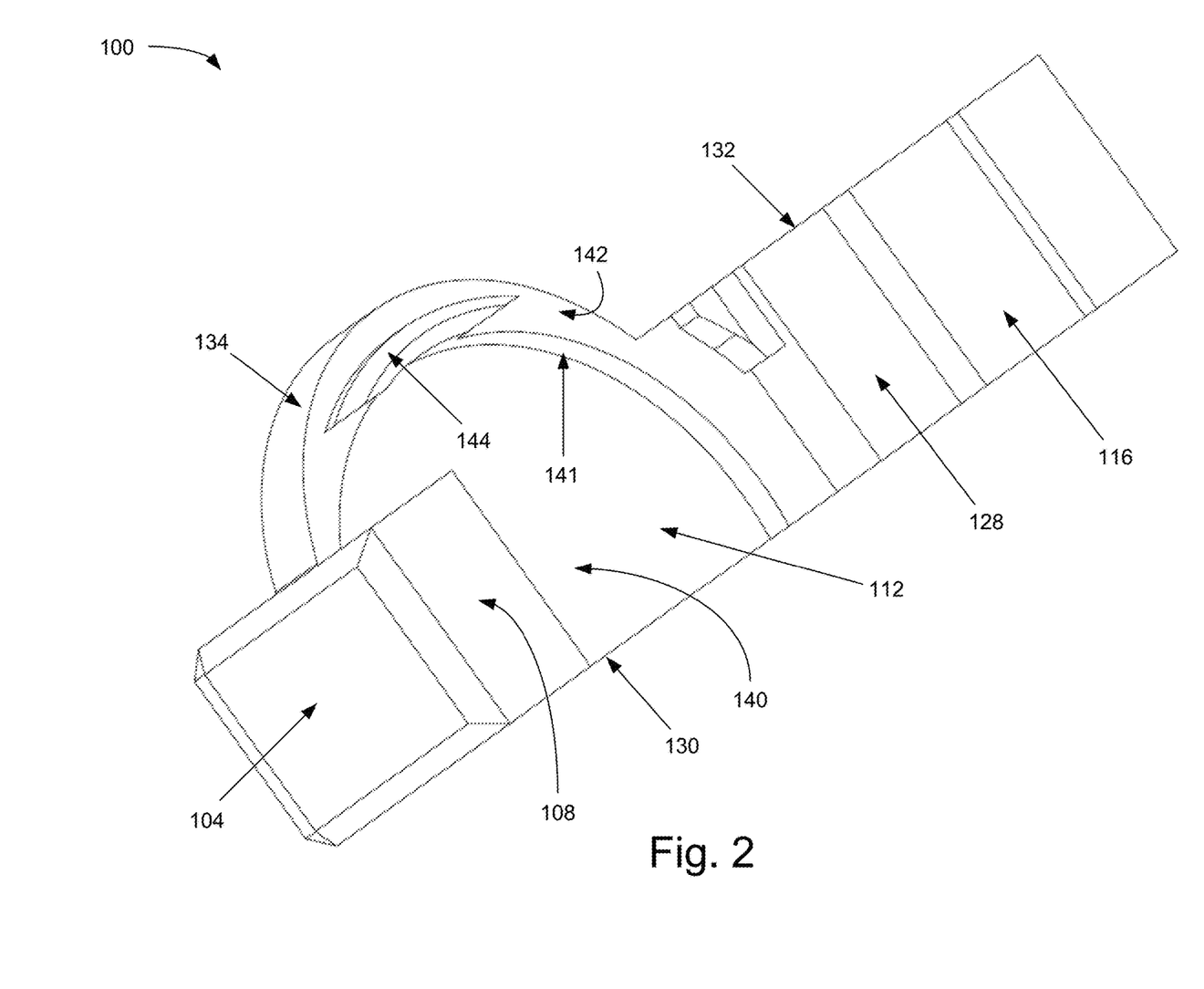
FIG. 2 is a rear perspective view of the cover device of FIG. 1.

FIG. 1 is a front perspective view of a cover device according to an embodiment. FIG. 2 is a rear perspective view of the cover device of FIG. 1.

The cover device 100 may be used to protect a button of a target device from inadvertent activation. One specific example is the activation button that can be pushed to activate or deactivate a body worn camera for taking pictures and/or recording videos. The cover device 100 includes a body having, on the exterior, an exterior front surface 102, an exterior left side surface 104 connected to the left side of the exterior front surface 102, an exterior right side surface 106 connected to the right side of the exterior front surface 102, an exterior left rear surface 108 connected to the exterior left side surface 104, and an exterior right rear surface 110 connected to the exterior right side surface 106. The exterior left rear surface 108 is spaced from the exterior right rear surface 110, forming an overall C-shaped configuration for the body. The body includes, on the interior corresponding to the exterior, an interior front surface 112, an interior left side surface 114 connected to the left side of the interior front surface 112, an interior right side surface 116 connected to the right side of the interior front surface 112, an interior left rear surface 118 connected to the interior left side surface 114, and an interior right rear surface 120 connected to the interior right side surface 116.

In the embodiment shown, a left slanted or left angled member (first side member) is disposed on the left side (first side) between the front member and the left side member (first side member) at left (or first) interior angles greater than 90° and smaller than 180°, and a right slanted or right angled member (second angled member) is disposed on the right side (the second side) between the front member and the right side member (second side member) at right (or second) interior angles greater than 90° and smaller than 180°. An interior angle means an angle measured on the interior side of the body. For example, the left angled member makes one left interior angle with the front member of about 150° and makes another left interior angle with the left side member of about 120°. The two left interior angles add up to about 270° which means that the left side member is about 90° from the front member (i.e., approximately perpendicular thereto, e.g., 90°±10%). Similarly, the right angled member makes one right interior angle with the front member of about 150° and makes another right interior angle with the right side member of about 120°. The two right interior angles add up to about 270° which means that the right side member is about 90° from the front member (i.e., substantially perpendicular thereto, e.g., 90°±10%).

The exterior front surface 102 includes an exterior left slanted portion or exterior left angled portion 122 connected to the exterior left side surface 104 and an exterior right slanted portion or exterior right angled portion 124 connected to the exterior right side surface 106. Similarly, the interior front surface includes an interior left angled portion or left slanted portion 126 connected to the interior left side surface 114 and an interior right angled portion 128 connected to the interior right side surface 116. The left rear member (first rear member) having the exterior left rear surface 108 and the interior left rear surface 118 is connected to the left side member, approximately perpendicularly (e.g., 90°±10%) and extends partially toward the right side member. The right rear member (second rear member) having the exterior right rear surface 110 and the interior right rear surface 120 is connected to the right side member, approximately perpendicularly (e.g., 90°±10%) and extends partially toward the left side member. The left rear member and the right rear member are spaced by a rear distance smaller than a distance between the left side member and the right side member. The rear distance may be about 90% or 80% or 70% of the distance between the left side member and the right side member.

The parts or members of the cover device 100 each have a generally uniform thickness, except for the left angled member (having the exterior left angled portion 122 and the interior left angled portion 126) and the right angled member (having the exterior right angled portion 124 and the interior right angled portion 128). The thickness of the left angled member generally decreases from the front member (having exterior front surface 102 and interior front surface 112) to the left side member (having exterior left side surface 104 and interior left side surface 114). The thickness of the right angled member generally decreases from the front member (having exterior front surface 102 and interior front surface 112) to the right side member (having exterior right side surface 106 and interior right side surface 116). The minimum thickness locations at the left angled member and at the right angled member each function similar to a hinge and allow the left side member and the right side member, respectively, to flex outwardly to open up the cover device body as a C-shaped clip and facilitate clipping the cover device onto a target device to protect an activation button on the target device such as a body camera from accidental activation. The minimum thickness at the left angled member and the right angled member may be about 10% lower, or 20% lower, or 30% lower in thickness than the thickness of the left side member and the thickness of the right side member, respectively. The location of the minimum thickness may be at the intersection between the left/right angled member and the left/right side member as shown. The left angled member (first angled member) includes a left (first) minimum thickness location having a left (first) minimum thickness which is thinner than a thickness of the left (first) side member. The right angled member (second angled member) includes a right (second) minimum thickness location having a right (second) minimum thickness which is thinner than a thickness of the right (second) side member. The left (first) minimum thickness location is at an intersection between the left (first) angled member and the left (first) side member. The left (first) angled member has a left (first) thickness which increases from the left (first) minimum thickness location to a left (first) maximum thickness location at or near an intersection between the left (first) angled member and the front member. The right (second) minimum thickness location is at an intersection between the right (second) angled member and the right (second) side member. The right (second) angled member has a right (second) thickness which increases from the right (second) minimum thickness location to a right (second) maximum thickness location at or near an intersection between the right (second) angled member and the front member.

In other embodiments, the minimum thickness location may be located on the left/right angled member at a different location somewhere between the intersection with the left/right side member and the intersection with the front member. In yet other embodiments, there may be multiple reduced thickness locations on the left/right angled member to simulate multiple hinges to the clip-on feature of the cover device.

In embodiments, the body has a generally flat bottom 130 and a generally flat top 132, except for a protruded top 134 at the front member. The top (including the flat top 132 and the protruded top 134) and the exterior surfaces (including the exterior front surface 102, the exterior left side surface 104, the exterior right side surface 106, the exterior left angled portion 122, and the exterior right angled portion 124) may include a beveled edge or chamfered edge 136. The protruded top 134 has a curved shape (e.g., a circular shape having a center of curvature at or near the bottom 130 of the front member). The front member of the body may have three thicknesses. The thinnest portion or smallest thickness portion of the interior front surface 112 forms a lower curved cut-out portion 140 extending from the bottom 130 to a curved edge 141 which may be substantially semi-circular in shape with a center of curvature at or near the bottom 130. The intermediate thickness portion 142 has an upper annular shape around the curved edge 141. The thickest portion or largest thickness portion of the interior front surface 112 forms an interior front protrusion or projection 144 disposed between the lower cut-out portion 140 and the annular intermediate thickness portion 142. The intermediate thickness portion 142 is thicker than the smallest thickness portion 140 and thinner than the largest thickness portion 144. In one embodiment, the interior front projection 144 has a curved bottom similar in shape to the curved edge 141 of the lower curved cut-out portion 140 and a curved top disposed between the curved bottom of the interior front projection 144 and the curved protruded top 134 of the front member of the body. The interior front projection 144 is configured to engage a gap between the activation button and the body of the target object such as a camera to lock the cover device 100 in position.

Figure 3:
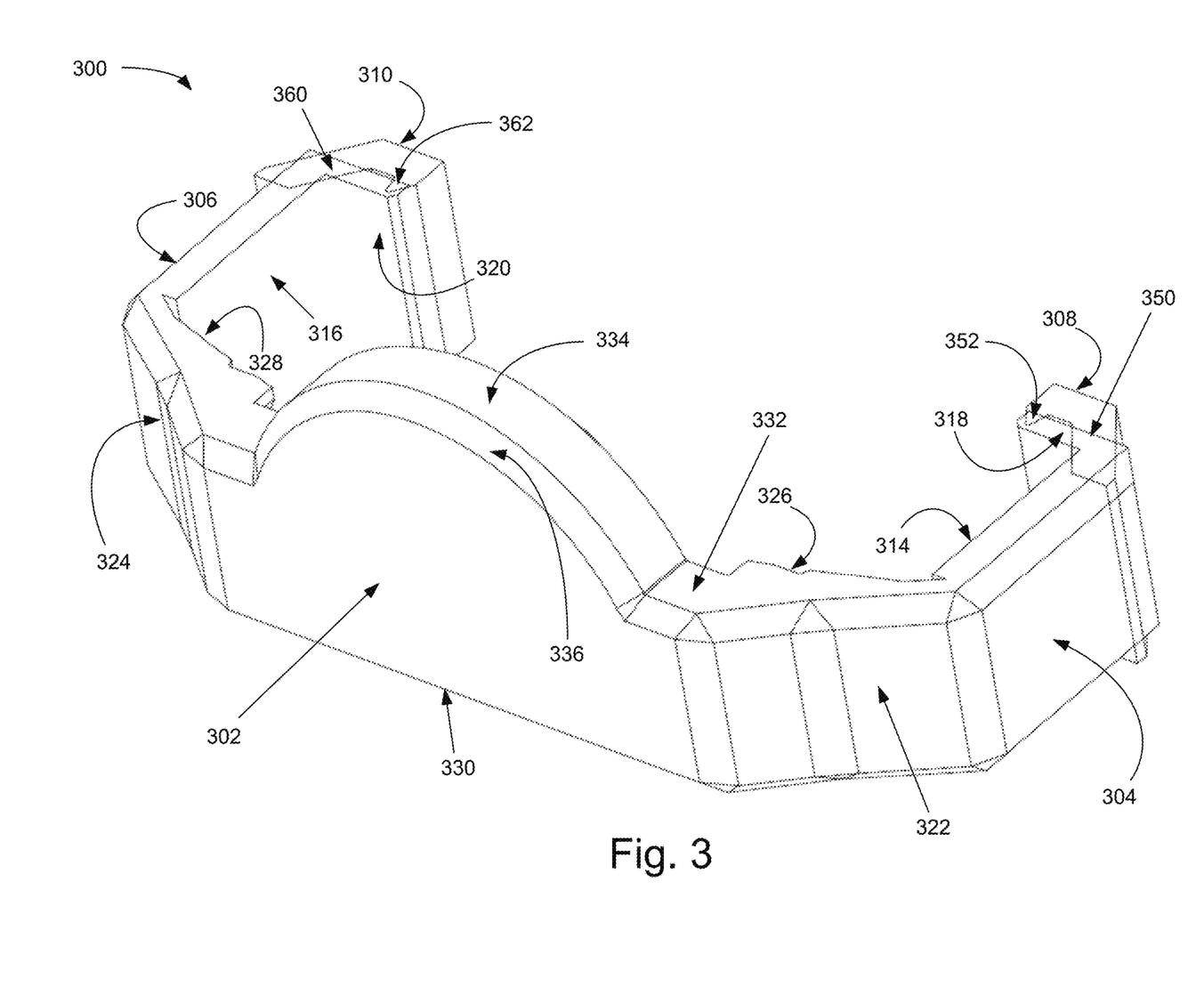
FIG. 3 is a front perspective view of the cover device according to another embodiment.
Figure 4:
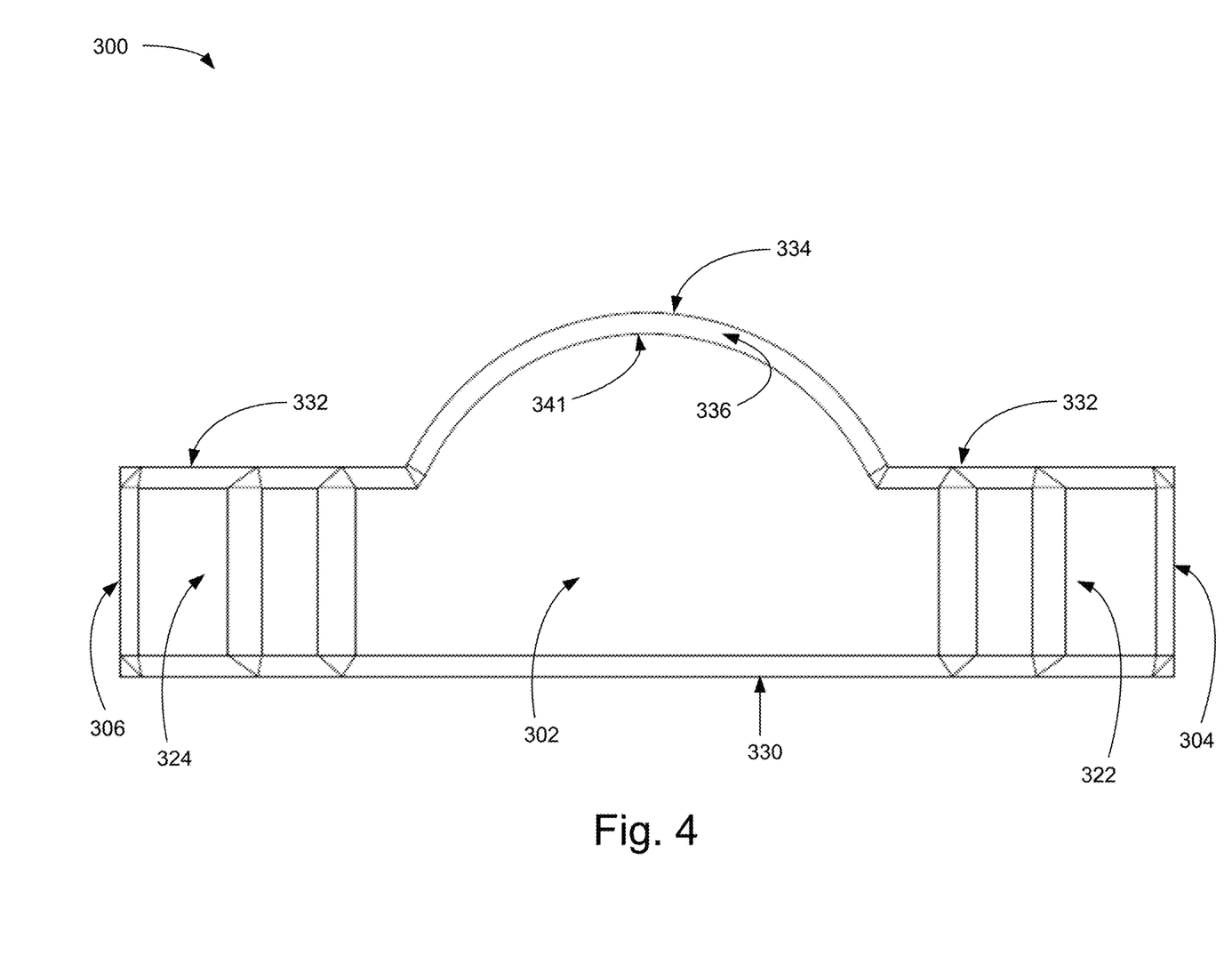
FIG. 4 is a front elevational view of the cover device of FIG. 3.
Figure 5:
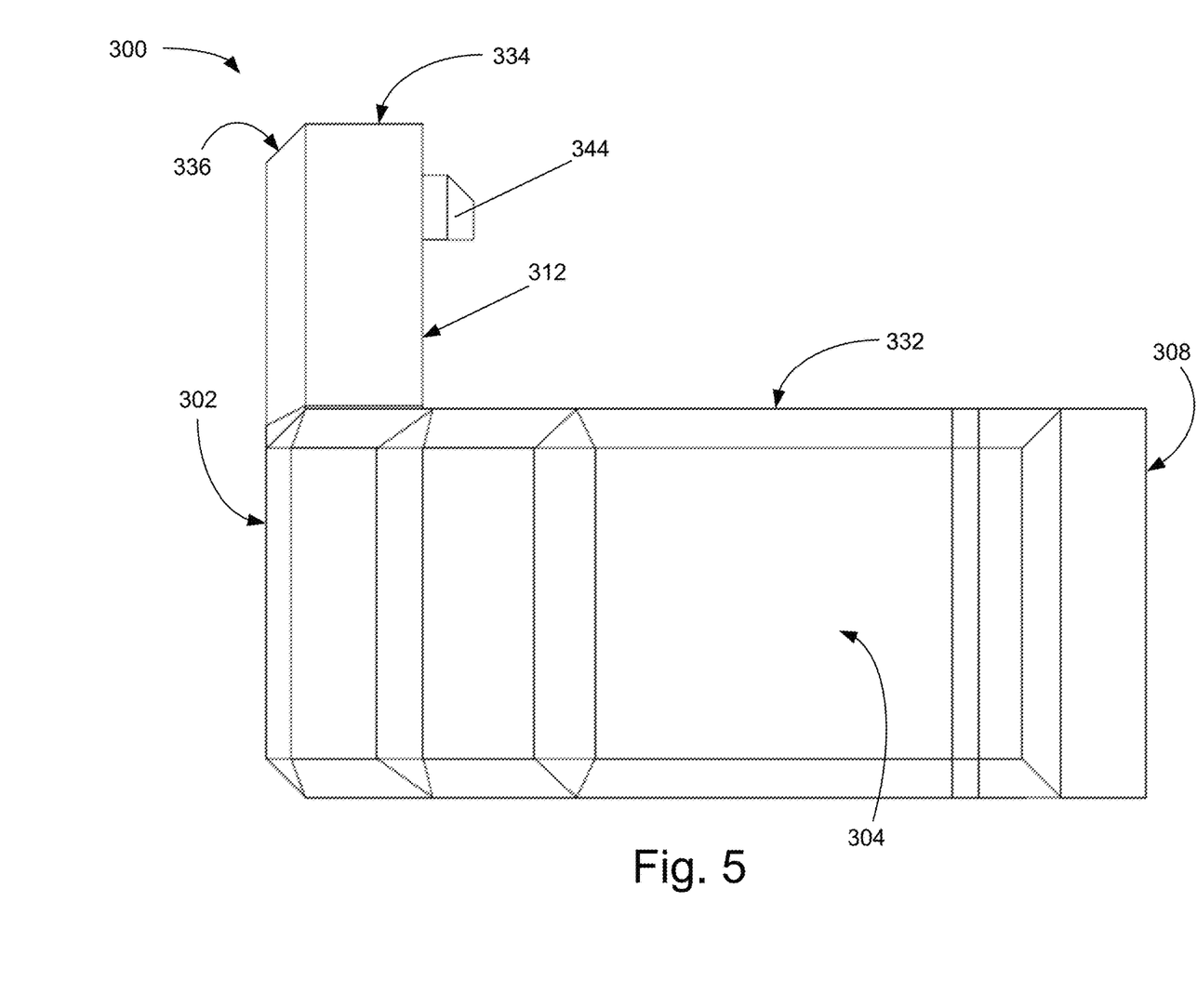
FIG. 5 is a side elevational view of the cover device of FIG. 3.
Figure 6:
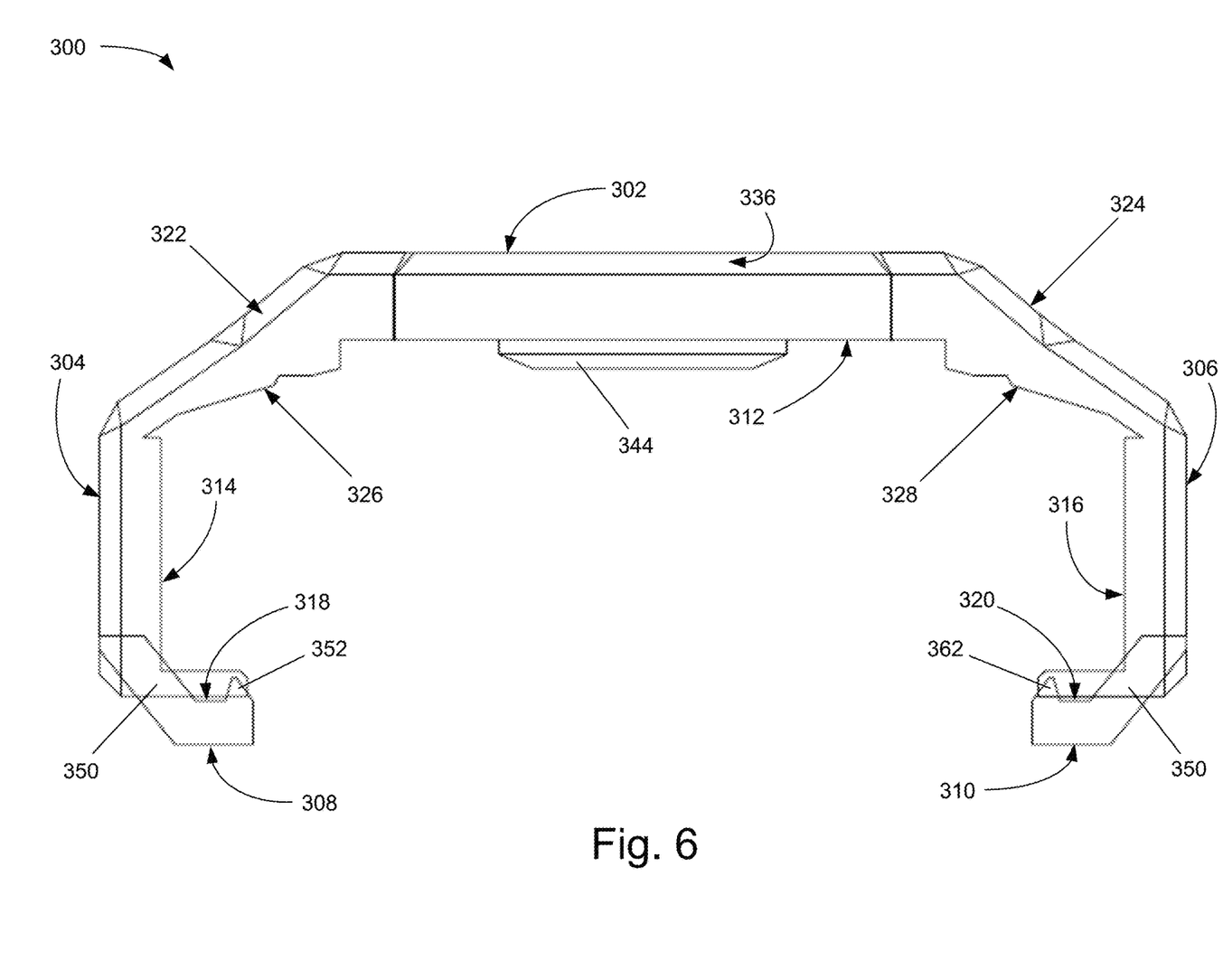
FIG. 6 is a top plan view of the cover device of FIG. 3.

FIG. 3 is a front perspective view of the cover device 300 according to another embodiment. FIG. 4 is a front elevational view of the cover device of FIG. 3. FIG. 5 is a side elevational view of the cover device of FIG. 3. FIG. 6 is a top plan view of the cover device of FIG. 3. The cover device 300 has many of the same features as the cover device 100 of FIGS. 1 and 2. For instance, the cover device 300 includes an exterior front surface 302, an exterior left slanted portion or exterior left angled portion 322 connected to the left side of the exterior front surface 302, an exterior left side surface 304 connected to the exterior left angled portion 322, an exterior right slanted portion or exterior right angled portion 324 connected to the right side of the exterior front surface 302, an exterior right side surface 306 connected to the exterior right angled portion 324, an exterior left rear surface 308 connected to the exterior left side surface 304, an exterior right rear surface 310 connected to the exterior right side surface 306, an interior front surface 312, an interior left angled portion 326 connected to the left side of the interior front surface 312, an interior left side surface 314 connected to the interior left angled portion 326, an interior right angled portion 328 connected to the right side of the interior front surface 312, an interior right side surface 316 connected to the interior right angled portion 328, an interior left rear surface 318 connected to the interior left side surface 314, an interior right rear surface 320 connected to the interior right side surface 316, a generally flat bottom 330, a generally flat top 332 except for a protruded top 334 at the front member, and a beveled edge or chamfered edge 336. The thinnest portion or smallest thickness portion of the interior front surface 312 forms a lower curved cut-out portion 340 with a curved edge 341. An intermediate thickness portion 342 has an upper annular shape around the curved edge 341. The thickest portion or largest thickness portion of the interior front surface 312 forms an interior front protrusion or projection 344 disposed between the lower cut-out portion 340 and the annular intermediate thickness portion 342.

Instead of a simple right-angle or perpendicular connection (with the exterior right rear surface 110 and the interior right rear surface 120 in FIG. 1; this perpendicular connection can still be seen in FIGS. 3 and 6 merely for comparison with a J-shaped hook design that replaces it), the left side member (having exterior left side surface 304 and interior left side surface 314) and the left rear member (having the exterior left rear surface 308 and interior left rear surface 318) is formed as a left J-shaped hook having a left angled or chamfered edge portion 350 and a left hook tip 352. Similarly, the right side member (having exterior right side surface 306 and interior right side surface 316) and the right rear member (having the exterior right rear surface 310 and interior right rear surface 320) is formed as a right J-shaped hook having a right slanted or chamfered edge portion 360 and a right hook tip 362. The left/right J-shaped hook is configured to flex at the left/right angled edge portion 350/360 to facilitate clipping the cover device 300 onto the target device having the activation button. The left/right hook tip 352/362 is a pointed tip that can provide a better grip of the cover device onto the target device to prevent slipping. The left (first) rear member forms a left (first) J-shaped hook with the left (first) side member with a left (first) tip of the left (first) J-shaped hook pointing toward the interior front surface 312 of the front member. The right (second) rear member forms a right (second) J-shaped hook with the right (second) side member with a right (second) tip of the right (second) J-shaped hook pointing toward the interior front surface 312 of the front member.

In specific embodiments, the cover device 300 has a single-piece body that is simple in construction and can be made easily and inexpensively, such as using 3D printing or molding. The cover device may be made of a hard or nondeformable plastic, rubber, metal, composite material, or the like. The material may be chosen to operate in harsh environments and stand up to the rigors of law enforcement activities.

In some embodiments, the cover device can be produced using spring loaded hinges on (1) the intersection between the front member and the left side member, (2) the intersection between the left side member and the left rear member, (3) the intersection between the front member and the right side member, and/or (4) the intersection between the right side member and the right rear member. Such a construction makes it easy to store the body of the cover device in a folded position and deploy it when needed.

In the embodiments shown, the front member is configured to partially cover an activation button (e.g., about 50%-65%) to significantly reduce the risk of inadvertent pressing of the activation button. In other embodiments, the cover device can be produced to cover a different portion or different percentage of the activation button, or completely cover the entire activation button. Covering the entire activation button would reduce the risk of inadvertent activation to zero or very close to zero. In addition, the cover device may be configured to allow the wearer or user to manually open and close the protective cover. This would give the user the ability to control the level of protection.

The embodiment shown has a left side member and a right side member which are about 180° apart. In other embodiments, there may be additional side members (e.g., three side members which are about 120° apart or four side members which are about 90° apart (e.g., left, right, top, and bottom side members). Additional side members would provide a more secure grip on the target device having the activation button such as a body worn camera.

Figure 7:
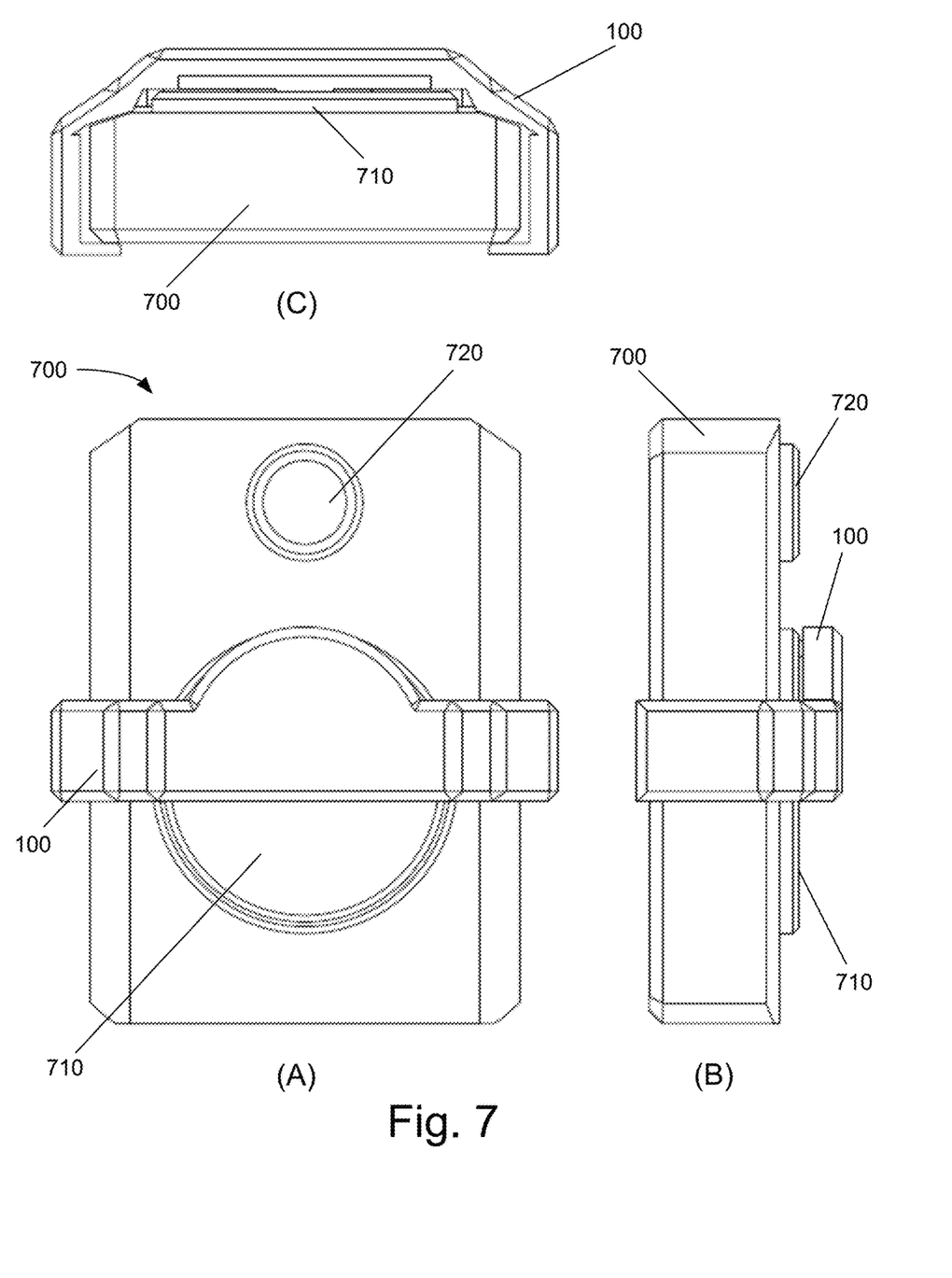
FIG. 7 shows the cover device 100 covering an activation button 710 of a camera 700, including (A) a front elevational view, (B) a side elevational view, and (C) a top plan view thereof.
Figure 8:
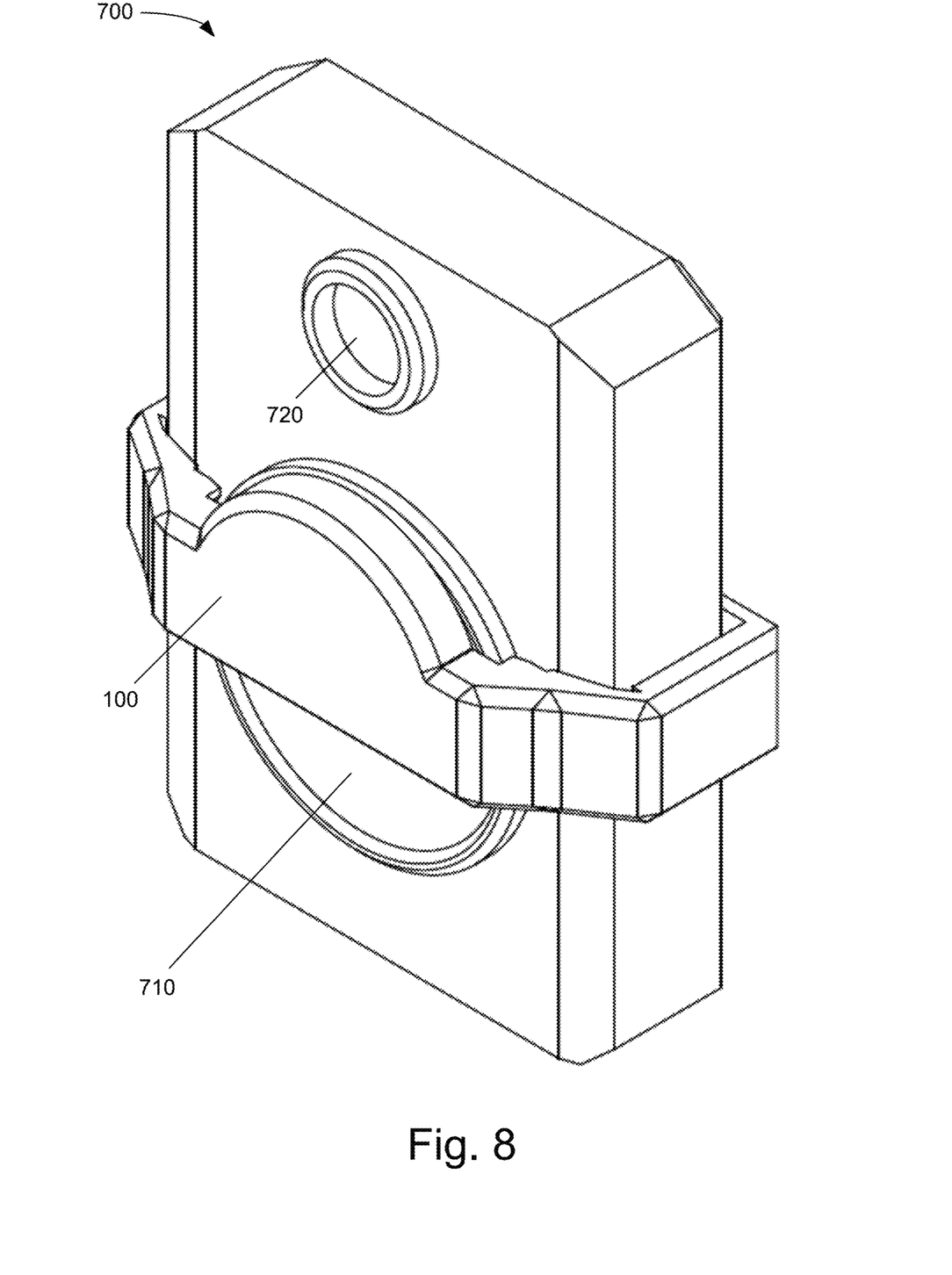
FIG. 8 is an upper front perspective view of the cover device covering the activation button.
Figure 9:
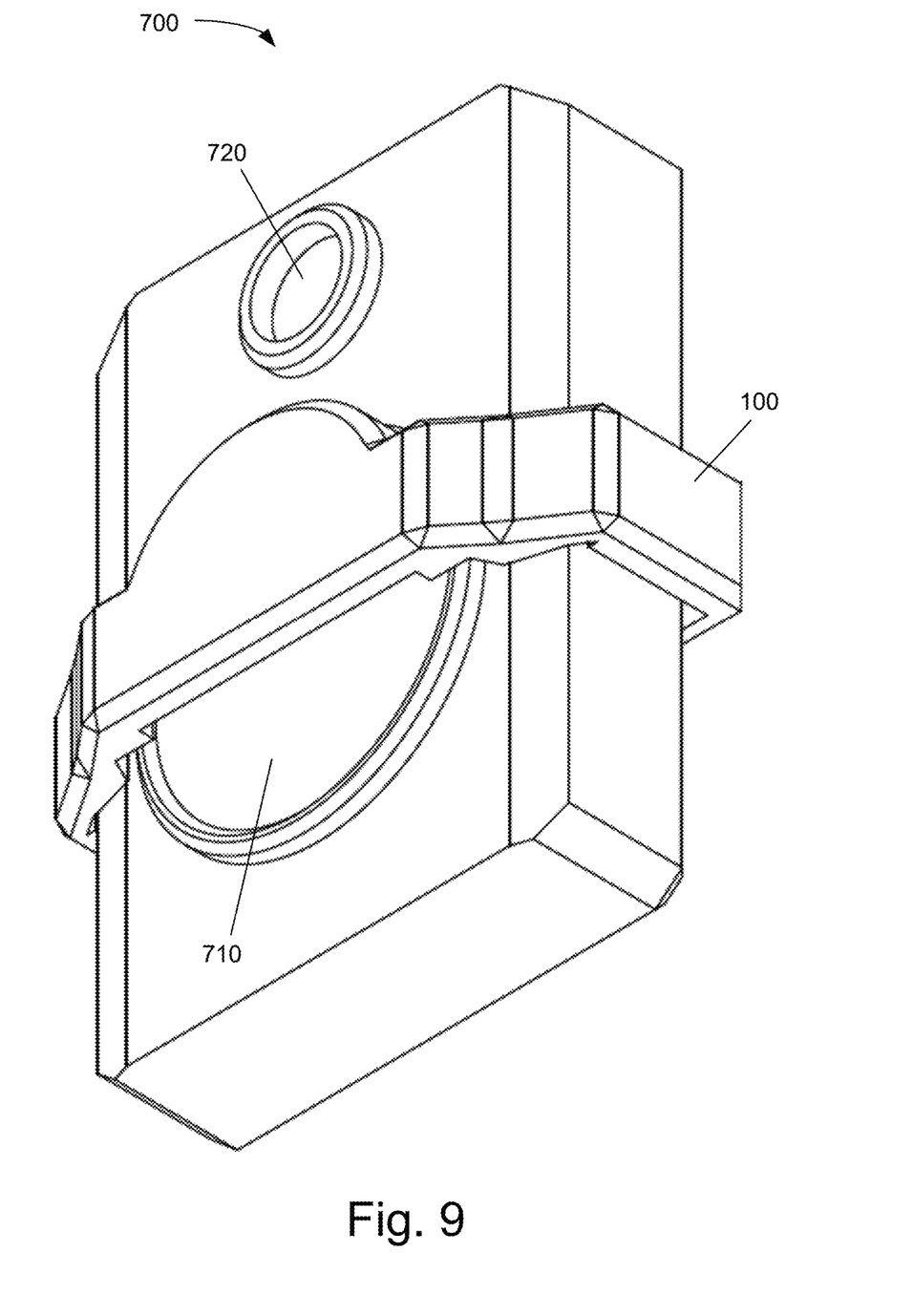
FIG. 9 is a lower front perspective view of the cover device covering the activation button.
Figure 10:
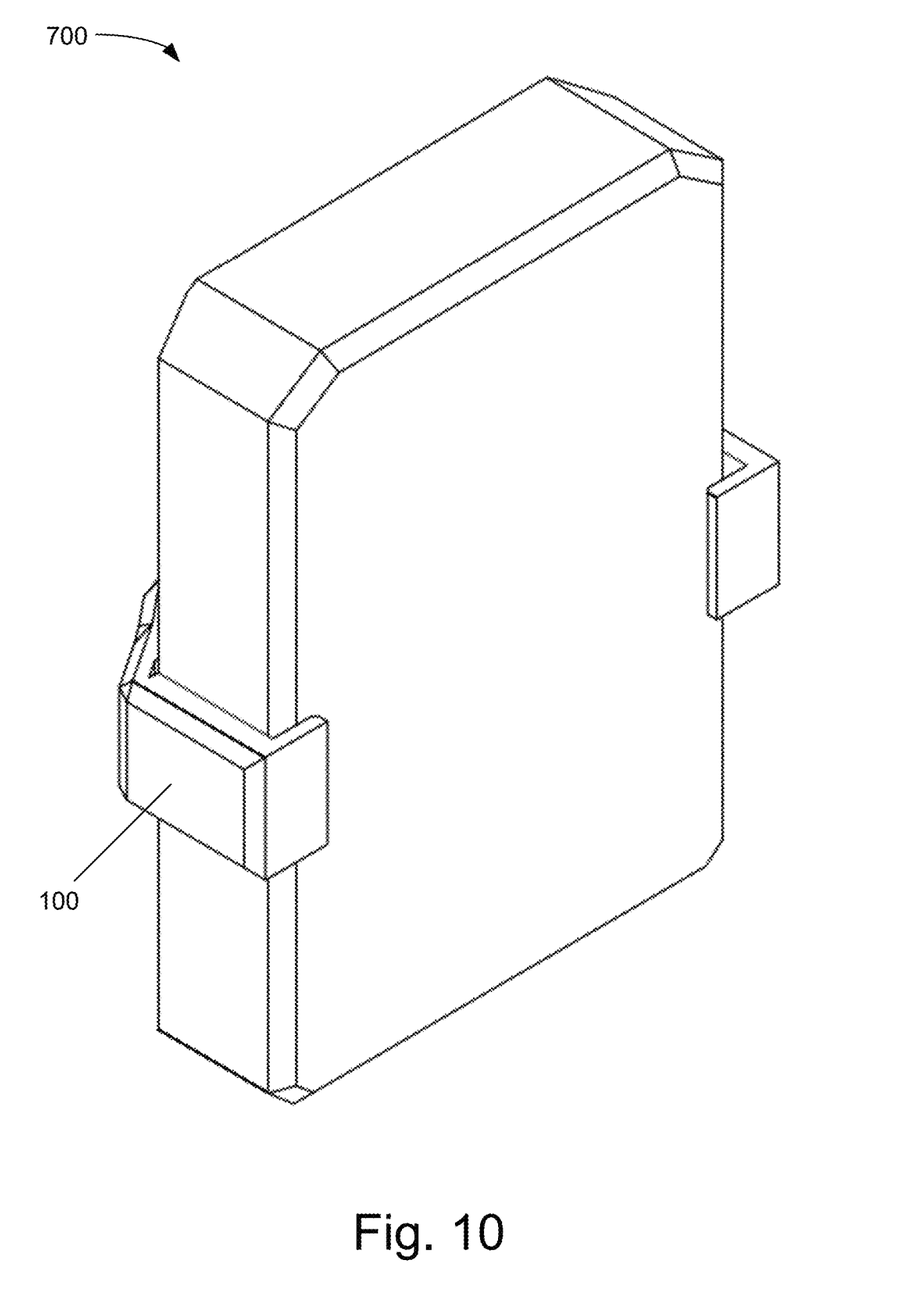
FIG. 10 is an upper rear perspective view of the cover device covering the activation button.

FIG. 7 shows the cover device 100 covering an activation button 710 of a camera 700, including (A) a front elevational view, (B) a side elevational view, and (C) a top plan view thereof. FIG. 8 is an upper front perspective view of the cover device covering the activation button. FIG. 9 is a lower front perspective view of the cover device covering the activation button. FIG. 10 is an upper rear perspective view of the cover device covering the activation button. The camera 700 has a lens 720 disposed above and spaced from the activation button 710.

The activation button is circular in shape. The front member covers the upper part of the activation button, about 50% to 60% thereof. The protruded top 334 of the front member has a similar circular shape to match the shape of the activation button. In other embodiments, the protruded top 334 may have other shapes (e.g., rectangular) that can still cover the same portion of the activation button 710 to prevent inadvertent activation. The front member may be configured to cover a different part of the activation button. Instead of a solid construction, the front member may be configured as a screen with openings that are sufficiently small and narrow to block the user's hand from pressing the activation button.

The left side member and the right side member are spaced from one another by approximately the width of the camera 700. The cover device is configured to clip on the camera and make a tight fit around the width of the camera.

The front member may be configured to cover about half (e.g., about 50% to 60%) of the activation button 710 leaving a remaining approximately half of the activation button 710 exposed. One feature of having the front member cover about half of the activation button 710 is that the wearer can deliberately bypass the cover device 100 and press the exposed part of the activation button 710 without having to remove or move the cover device from the activation button 710. In that way, only one hand of the user is required to press the activation button to activate or deactivate the camera, while both hands are required to remove or move the cover device from the activation button 710. The cover device has a sufficient size and profile to allow the user to identify the cover device by tactilely feeling it with fingers of the hand without the need to look down and visually see the activation button 710.

The inventive concepts taught by way of the examples discussed above are amenable to modification, rearrangement, and embodiment in several ways. For example, this invention may be applicable in other environments involving body worn devices other than a body camera. The shapes of the various parts of the cover device may be modified while maintaining their functional aspects. The following are some examples.

The cover device may be configured to attach to the target device having an activation button by a magnetic arrangement on both the cover device and the target device allowing for ease of use.

The cover device may be configured to attach to the target device having an activation button by a hook and loop attachment on both the cover device and the target device allowing for ease of use.

The cover device may be configured to allow manual opening and closing to cover an activation button partially or completely. This would allow the user the ability to control the level of protection.

The cover device may include a manual shutter for covering the camera lens 720 of a camera in addition partially or completely covering the activation button 710 of the camera 700.

The cover device may include a bumper that surrounds the camera lens of a camera having an activation button, preventing damage to the camera lens while being worn by a user.

The cover device may include a battery and a small white LED light that would allow for areas in front of the body worn camera to be illuminated.

The cover device may include a battery and a small red and blue LED light that would allow for areas in front of the body worn camera to be illuminated with emergency type lights denoting the wearer as law enforcement.

The cover device may include a lanyard loop for attaching a lanyard to be used to secure the body worn camera to the wearer via the lanyard.

Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A cover device for a target device having an activation button, the cover device having a body which comprises:
    a front member configured to cover the activation button at least partially;
    a first side member disposed on a first side of the front member;
    a second side member disposed on a second side of the front member;
    a first rear member connected to the first side member and extending partially toward the second side member; and
    a second rear member connected to the second side member and extending partially toward the first side member;
    the first rear member and the second rear member being spaced by a rear distance smaller than a distance between the first side member and the second side member;
    the first side member being approximately perpendicular to the front member and the second side member is approximately perpendicular to the front member;
    the body further comprising a first angled member disposed on the first side of the front member and connected between the front member and the first side member at first interior angles greater than 90° and smaller than 180°;
    the body further comprising a second angled member disposed on the second side of the front member and connected between the front member and the second side member at second interior angles greater than 90° and smaller than 180°;
    the first angled member including a first minimum thickness location having a first minimum thickness which is thinner than a thickness of the first side member; and
    the second angled member including a second minimum thickness location having a second minimum thickness which is thinner than a thickness of the second side member.

2. The cover device of claim 1,
    wherein the first minimum thickness location is at an intersection between the first angled member and the first side member, and the first angled member has a first thickness which increases from the first minimum thickness location to a first maximum thickness location at or near an intersection between the first angled member and the front member; and
    wherein the second minimum thickness location is at an intersection between the second angled member and the second side member, and the second angled member has a second thickness which increases from the second minimum thickness location to a second maximum thickness location at or near an intersection between the second angled member and the front member.

3. The cover device of claim 1,
    wherein the first rear member is substantially perpendicular to the first side member and the second rear member is substantially perpendicular to the second side member.

4. The cover device of claim 1,
    wherein the first rear member forms a first J-shaped hook with the first side member, a first tip of the first J-shaped hook pointing toward an interior front surface of the front member; and
    wherein the second rear member forms a second J-shaped hook with the second side member, a second tip of the second J-shaped hook pointing toward the interior front surface of the front member.

5. The cover device of claim 1,
    wherein the front member is configured to cover about half of the activation button leaving a remaining approximately half of the activation button exposed.

6. The cover device of claim 1, wherein the front member includes:
    a smallest thickness portion extending from a bottom of the body to a curved edge of a lower curved cut-out portion;
    an intermediate thickness portion having an upper annular shape around the curved edge; and
    a largest thickness portion forming an interior front projection disposed between the smallest thickness portion and the intermediate thickness portion.

7. A cover device for a target device having an activation button, the cover device having a body which comprises:
    a front member configured to cover the activation button at least partially;
    a first side member disposed on a first side of the front member;
    a second side member disposed on a second side of the front member;
    a first rear member connected to the first side member and extending partially toward the second side member; and
    a second rear member connected to the second side member and extending partially toward the first side member;
    the first rear member forming a first J-shaped hook with the first side member, a first tip of the first J-shaped hook pointing toward an interior front surface of the front member;
    the second rear member forming a second J-shaped hook with the second side member, a second tip of the second J-shaped hook pointing toward the interior front surface of the front member;
    a first angled member disposed on the first side of the front member and connected between the front member and the first side member at first interior angles greater than 90° and smaller than 180°; and
    a second angled member disposed on the second side of the front member and connected between the front member and the second side member at second interior angles greater than 90° and smaller than 180°;
    the first angled member including a first minimum thickness location having a first minimum thickness which is thinner than a thickness of the first side member; and
    the second angled member including a second minimum thickness location having a second minimum thickness which is thinner than a thickness of the second side member.

8. The cover device of claim 7,
    wherein the first minimum thickness location is at an intersection between the first angled member and the first side member, and the first angled member has a first thickness which increases from the first minimum thickness location to a first maximum thickness location at or near an intersection between the first angled member and the front member; and
    wherein the second minimum thickness location is at an intersection between the second angled member and the second side member, and the second angled member has a second thickness which increases from the second minimum thickness location to a second maximum thickness location at or near an intersection between the second angled member and the front member.

9. The cover device of claim 7, wherein:
the first rear member and the second rear member are spaced by a rear distance smaller than a distance between the first side member and the second side member;
the first side member is approximately perpendicular to the front member and the second side member is approximately perpendicular to the front member; and
the first rear member is substantially perpendicular to the first side member and the second rear member is substantially perpendicular to the second side member.

10. A cover device for a target device having an activation button, the cover device having a body which comprises:
a front member configured to cover the activation button at least partially;
a first side member disposed on a first side of the front member; and
a second side member disposed on a second side of the front member;
the front member including a smallest thickness portion extending from a bottom of the body to a curved edge of a lower curved cut-out portion; an intermediate thickness portion having an upper annular shape around the curved edge; and a largest thickness portion forming an interior front projection disposed between the smallest thickness portion and the intermediate thickness portion.

11. The cover device of claim 10, wherein:
the first side member is approximately perpendicular to the front member and the second side member is approximately perpendicular to the front member;
the body further comprises a first angled member disposed on the first side of the front member and connected between the front member and the first side member at first interior angles greater than 90° and smaller than 180°; and
the body further comprises a second angled member disposed on the second side of the front member and connected between the front member and the second side member at second interior angles greater than 90° and smaller than 180°.

12. The cover device of claim 11,
wherein the first angled member includes a first minimum thickness location having a first minimum thickness which is thinner than a thickness of the first side member; and
wherein the second angled member includes a second minimum thickness location having a second minimum thickness which is thinner than a thickness of the second side member.

13. The cover device of claim 12,
wherein the first minimum thickness location is at an intersection between the first angled member and the first side member, and the first angled member has a first thickness which increases from the first minimum thickness location to a first maximum thickness location at or near an intersection between the first angled member and the front member; and
wherein the second minimum thickness location is at an intersection between the second angled member and the second side member, and the second angled member has a second thickness which increases from the second minimum thickness location to a second maximum thickness location at or near an intersection between the second angled member and the front member.

14. The cover device of claim 10, further comprising:
a first rear member connected to the first side member and extending partially toward the second side member; and
a second rear member connected to the second side member and extending partially toward the first side member;
wherein the first rear member and the second rear member are spaced by a rear distance smaller than a distance between the first side member and the second side member.

15. A cover device for a target device having an activation button, the cover device having a body which comprises:
a front member configured to cover the activation button at least partially;
a first side member disposed on a first side of the front member;
a second side member disposed on a second side of the front member;
a first rear member connected to the first side member and extending partially toward the second side member; and
a second rear member connected to the second side member and extending partially toward the first side member;
the first rear member and the second rear member being spaced by a rear distance smaller than a distance between the first side member and the second side member; and
the front member being configured to cover about half of the activation button leaving a remaining approximately half of the activation button exposed.

16. The cover device of claim 15,
wherein the first rear member is substantially perpendicular to the first side member and the second rear member is substantially perpendicular to the second side member.

17. The cover device of claim 15, wherein the front member includes:
a smallest thickness portion extending from a bottom of the body to a curved edge of a lower curved cut-out portion;
an intermediate thickness portion having an upper annular shape around the curved edge; and
a largest thickness portion forming an interior front projection disposed between the smallest thickness portion and the intermediate thickness portion.

18. A cover device for a target device having an activation button, the cover device having a body which comprises:
a front member configured to cover the activation button at least partially;
a first side member disposed on a first side of the front member;
a second side member disposed on a second side of the front member;
a first rear member connected to the first side member and extending partially toward the second side member; and
a second rear member connected to the second side member and extending partially toward the first side member;
the first rear member and the second rear member being spaced by a rear distance smaller than a distance between the first side member and the second side member; and
the front member includes a smallest thickness portion extending from a bottom of the body to a curved edge of a lower curved cut-out portion; an intermediate thickness portion having an upper annular shape around the curved edge; and a largest thickness portion forming an interior front projection disposed between the smallest thickness portion and the intermediate thickness portion.

19. The cover device of claim 18,
wherein the first rear member is substantially perpendicular to the first side member and the second rear member is substantially perpendicular to the second side member.

20. A cover device for a target device having an activation button, the cover device having a body which comprises:
a front member configured to cover the activation button at least partially;
a first side member disposed on a first side of the front member;
a second side member disposed on a second side of the front member;
a first rear member connected to the first side member and extending partially toward the second side member; and
a second rear member connected to the second side member and extending partially toward the first side member;
the first rear member forming a first J-shaped hook with the first side member, a first tip of the first J-shaped hook pointing toward an interior front surface of the front member;
the second rear member forming a second J-shaped hook with the second side member, a second tip of the second J-shaped hook pointing toward the interior front surface of the front member; and
the front member being configured to cover about half of the activation button leaving a remaining approximately half of the activation button exposed.

21. The cover device of claim 20, wherein:
the first rear member and the second rear member are spaced by a rear distance smaller than a distance between the first side member and the second side member;
the first side member is approximately perpendicular to the front member and the second side member is approximately perpendicular to the front member; and
the first rear member is substantially perpendicular to the first side member and the second rear member is substantially perpendicular to the second side member.

22. The cover device of claim 20, wherein the front member includes:
a smallest thickness portion extending from a bottom of the body to a curved edge of a lower curved cut-out portion;
an intermediate thickness portion having an upper annular shape around the curved edge; and
a largest thickness portion forming an interior front projection disposed between the smallest thickness portion and the intermediate thickness portion.

\* \* \* \* \*